April 18, 1967            E. C. IKE            3,314,438

VALVE FOR FLUID PRESSURE BRAKE SYSTEM AND THE LIKE

Original Filed Aug. 12, 1963            4 Sheets-Sheet 1

INVENTOR.
Ernest C. Ike
BY
Attorneys

April 18, 1967 E. C. IKE 3,314,438
VALVE FOR FLUID PRESSURE BRAKE SYSTEM AND THE LIKE
Original Filed Aug. 12, 1963 4 Sheets-Sheet 2

INVENTOR.
Ernest C. Ike
BY
Attorneys

INVENTOR.
Ernest C. Ike
BY
Attorneys

INVENTOR.
Ernest C. Ike
BY
Attorneys

United States Patent Office 3,314,438
Patented Apr. 18, 1967

3,314,438
VALVE FOR FLUID PRESSURE BRAKE
SYSTEM AND THE LIKE
Ernest C. Ike, Lafayette, Calif., assignor to Western Die Casting Company, Emeryville, Calif., a corporation of California
Original application Aug. 12, 1963, Ser. No. 301,360, now Patent No. 3,181,426, dated May 4, 1965. Divided and this application Nov. 5, 1964, Ser. No. 419,263
3 Claims. (Cl. 137—102)

This application is a division of application Serial No. 301,360 now Patent No. 3,181,426 filed Aug. 12, 1963.

This invention relates to valves for fluid pressure brake systems and more particularly to such valves for use in a system wherein pressure is normally applied to release the brake.

In the usual braking systems of trucks and the like, two distinct brake systems are employed. Each of these brake systems may be pneumatically operated. One of the systems operates through the brake foot pedal of the vehicle and ordinarily applies brakes by the application of air to a cylinder to urge the brake shoes against a cooperating brake drum. The second system of brakes is normally an emergency type system which goes into operation upon loss of air pressure in the main brake system. The second system is ordinarily a spring brake and air pressure is applied to compress the spring and thereby release the brake. Upon a reduction or release of this air pressure the spring urges a brake shoe against the drum. Thus in one brake system on the vehicle air pressure is employed to apply the brakes and in the second system of the same vehicle, air pressure is employed to release the brakes. Air pressure is applied in the first of these systems by activation of the brake pedal and in the second system by the loss of air pressure.

While such systems have been in use for a considerable length of time, certain difficulties have arisen which have somewhat reduced the overall effectiveness of the spring brake. Thus in systems employing a spring brake if the loss of air pressure is gradual, the spring would ordinarily gradually apply the brakes over a relatively long period of time. This gradual application of the brakes ordinarily heats the brake shoes and drums and makes subsequent application of the full brake ineffective.

Application of the spring brakes have caused problems hereinbefore in that the vehicle may be stopped involuntarily at an inconvenient or dangerous location, such as in the center of an intersection or on a bridge. Spring brakes, in systems heretofore used, are not easily released once applied unless air pressure is subsequently developed. With a rupture in the brake system the required increase in air pressure cannot ordinarily be obtained until the damaged air supply system can be repaired.

It is, therefore, a general object of this invention to provide an improved braking system and valve therefor.

It is a more particular object of this invention to provide an improved brake system and valve for use with a spring type brake.

It is another object of this invention to provide a system and valve of the aforementioned character wherein a secondary or emergency tank is employed whereby the spring brake may be released.

It is another object of this invention to provide a system and valve of the aforementioned character wherein the emergency tank is charged with air pressure during the entire time that air is applied to the spring brake.

It is still another object of this invention to provide a system and valve of the aforementioned character wherein the spring brake exerts no braking action until the air pressure in the system is reduced to a predetermined minimum at which time the brakes are applied rapidly.

It is still another object of this invention to provide a system and valve of the aforementioned character wherein cam means are employed to open a check valve against the action of the spring such that air from the emergency tank may be applied to the spring brake cylinder.

It is still a further object of this invention to provide a system and valve of the aforementioned character wherein the spring brake may be applied voluntarily by the driver of the vehicle as well as involuntarily upon a reduction in air pressure.

It is still another object of this invention to provide the system and valve of the aforementioned character wherein signal or indicating means are employed to indicate the voluntary or involuntary application of the spring brake.

These and other objects and features of the invention will become more clearly apparent upon a review of the following description in conjunction with the accompanying drawing, in which.

Figure 1:
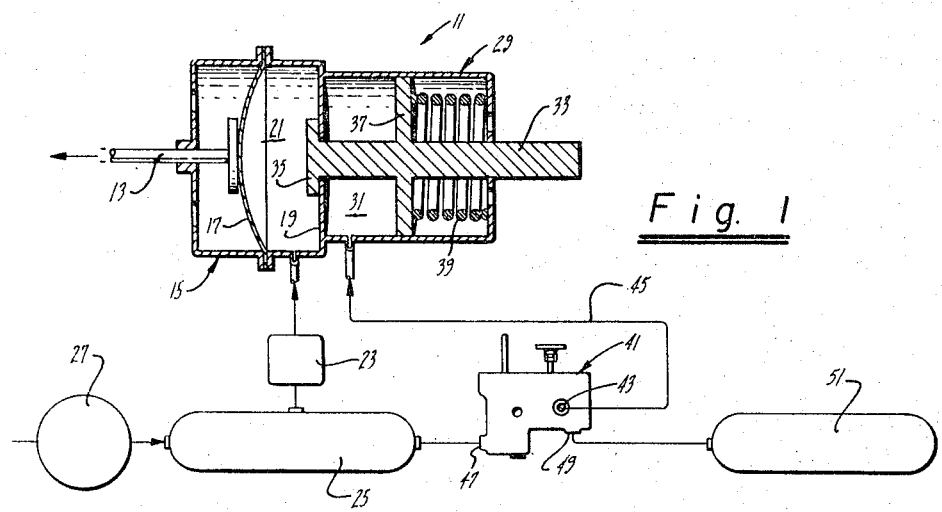
FIGURE 1 is a schematic diagram of a brake system in accordance with this invention employing a valve in accordance with this invention.

Referring to the drawing, there is shown at 11, a combination air brake-spring brake cylinder for use on trucks and other vehicles. The cylinder includes a brake plunger 13 which, when extended to the left, applies the brakes of the vehicle to slow it down or stop it. When the plunger 13 is moved to the right the brakes are released. The cylinder 11 includes a first portion 15 which has therein a flexible diaphragm 17 connected to the plunger 13. The diaphragm 17 together with the rear wall 19 of the first portion 15 defines a chamber 21. When air is applied to the chamber 21, the plunger 13 is thereby moved to the left to apply the brakes. Air is ordinarily applied by the application of the foot brake pedal 23 which is connected to an air supply tank 25 and which in turn, is connected to a compressor 27.

In addition, the brake cylinder 11 includes a second portion 29 known generally as the spring brake. While the spring brake shown is attached to the normal air brake portion 15, such attached or "piggyback" arrangement is a relatively recent innovation and is not necessary for the purposes of this invention.

The spring brake 29 also includes an air chamber 31 together with a plunger 33. The plunger 33 passes through the rear wall 19 of the first cylinder portion 15 and includes an element 35 which may, if urged to the left, force the plunger 13 to the left thereby applying the brakes. A disc 37 is also connected to the plunger 31 and serves not only to provide a pneumatic seal for the chamber 31 but also to compress a spring 39. Under normal conditions when the vehicle is running, the chamber 31 is charged with air whereby the spring 39 is compressed. Moreover, while the vehicle is running the chamber 21 is connected to the atmosphere whereby the plunger 13 is moved to the right by operation of springs (not shown) connected to the brake shoes or other elements of the brake system.

A valve 41 includes a cylinder port 43 which is connected to the chamber 31 through a line 45. An inlet port 47 of the valve 41 is connected to the supply tank 25 while an emergency tank port 49 connects the valve to an emergency or auxiliary tank 51.

Figure 2:
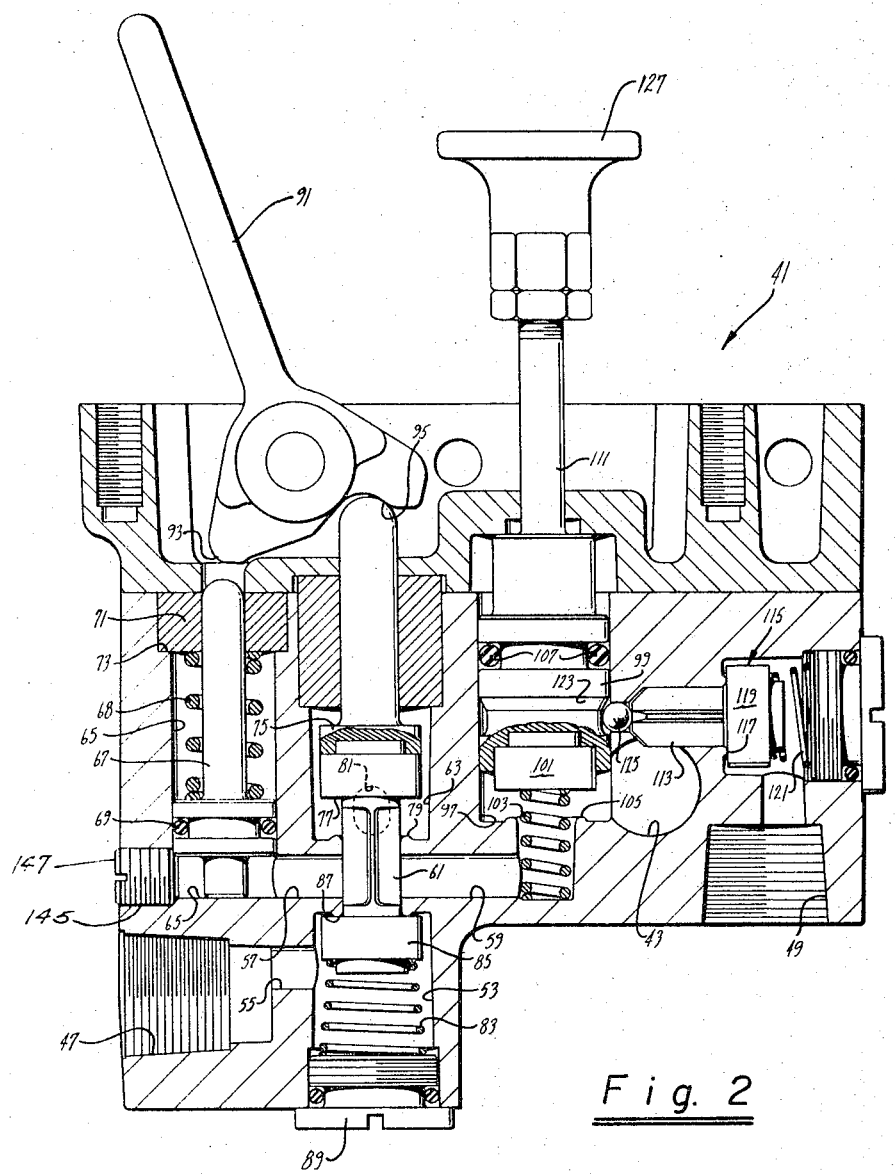
FIGURE 2 is an elevational view of the valve shown in FIGURE 1 with one side plate removed and with sections partially cut away and showing the valve in an initial condition prior to the application of any air pressure thereto, said condition of the valve being equally true upon a reduction of air pressure in the system.
Figure 3:
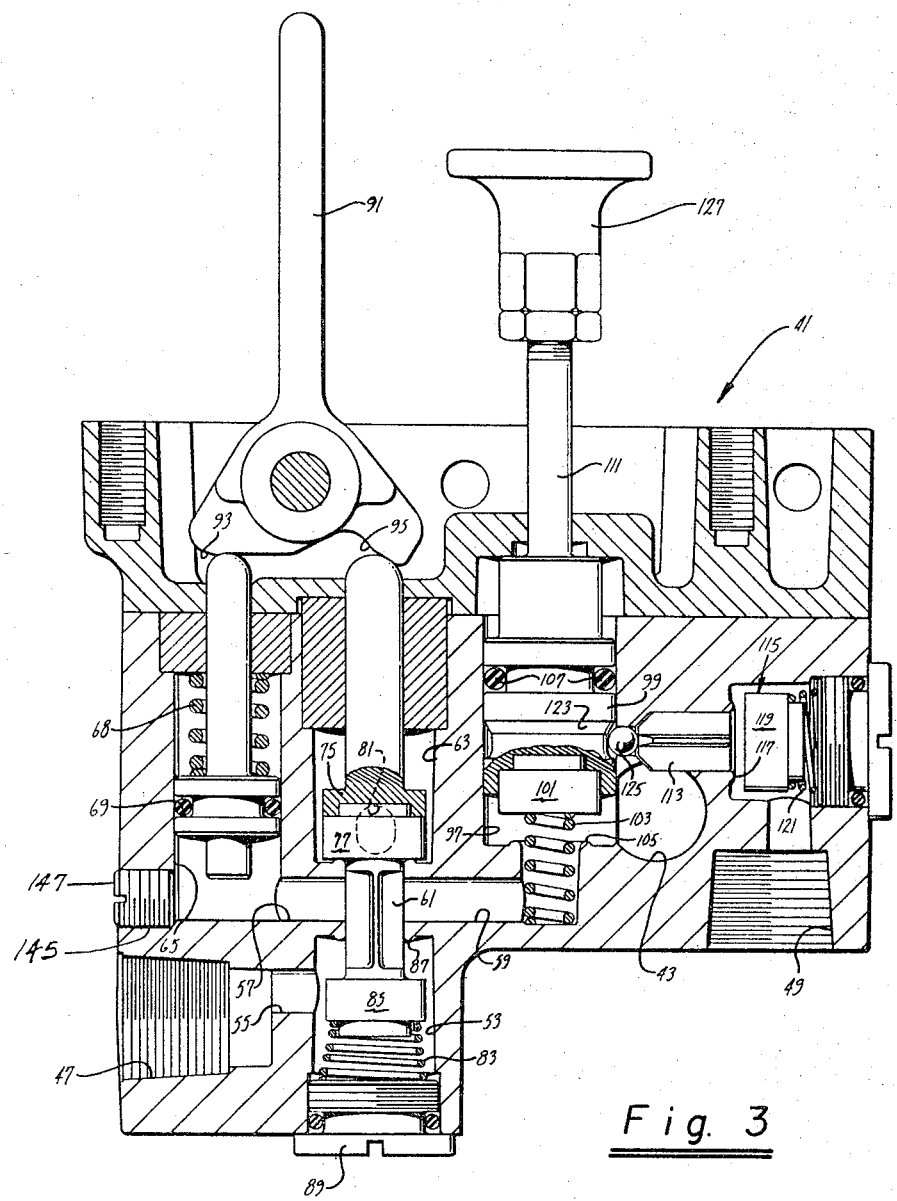
FIGURE 3 is a view similar to FIGURE 2 showing a valve in normal condition during operation of the vehicle.
Figure 4:
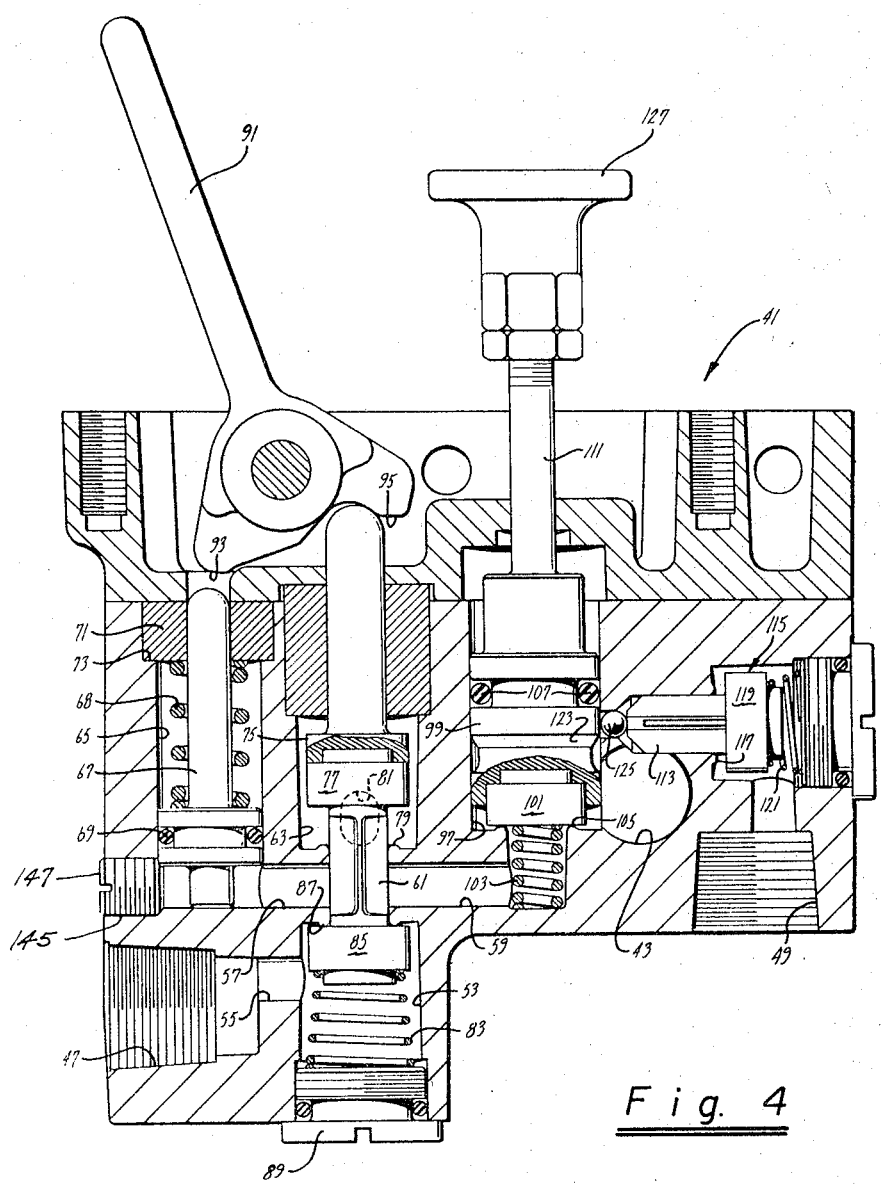
FIGURE 4 is a view similar to FIGURE 2 showing the position of the valve while employed to operate the spring brake with air from the emergency tank.

Referring to FIGURES 2, 3 or 4 the valve 41 is shown in more detail. The inlet port 47 communicates with a chamber 53 by means of a port 55. The chamber 53 is selectively in communication with the ports 57 and 59 through a lifter 61. The ports 57 and 59 are likewise selectively in communication with a chamber 63 through the same lifter 61. The port 57 communicates with an additional chamber 65 in which rides a pressure sensing piston 67. Spring 68 urges the piston 67 downward and an O-ring 69 engages the piston 67 and the sides of the chamber 65 to prevent the passage of air thereby. A bushing 71 receives the piston 67 and is itself, accommodated by the shoulders 73 in the body of the valve. The bushing 71 fits relatively loosely on the shoulders 73 such that motion of the bushing transverse to the axis of the piston 67 will prevent cocking the piston 67 within the chamber 65. In addition, a port (not shown) may be provided in the vicinity of the shoulders 73 whereby chamber 65, above the O-ring 69, is vented to atmosphere.

A piston 75 is disposed in the chamber 63 and carries thereon a valve seal 77 which selectively cooperates with the valve seat 79 to interrupt the aforementioned communication from the chamber 63 to the ports 57 and 59. An exhaust port 81 places the chamber 63 in communication with the atmosphere outside the valve 41.

A light spring 83 is located within the chamber 53 and resiliently urges a valve seat seal 85 into engagement with the seat 87, whereby communication from the chamber 53 to the ports 57 and 59 may be interrupted. A plug 89 provides a stop for the spring 83. The plug 89 may be removed and a light switch substituted in accordance with an embodiment shown hereinafter at FIGURE 6.

The pistons 67 and 75 are disposed for opposed movement by means of a control member or toggle 91 which includes cam arms 93 and 95. Upward movement of the piston 67 causes a corresponding downward movement of the piston 75. Conversely, upward movement of the piston 75 tends to cause downward movement of the piston 67. Downward movement of either piston 67 or 75, however, does not cause or tend to cause, corresponding movement of the other piston. The downward movement of piston 67 merely permits the piston 75 to rise under the influence of the spring 83 and air pressure at the valve seal 77. Thus, it is seen that as the lever 91 lies in the position shown in FIGURES 2 and 4, the piston 75 as well as the lifter 61 and the valve seat seal 85 may be urged upwardly under the influence of the spring 83.

The port 59 connects with still another chamber 97 which carries therein a piston 99 having a valve seal 101. A spring 103 resiliently urges the piston 99 upward whereby the seal 101 is raised off the valve seat 105. The piston 99 carries an O-ring seal 107 whereby the portions of the chamber 97 above and below the seal 107 are isolated. The portion of the chamber above the seal 107 may be connected to the atmosphere by means of a loose fit of the valve body about the stem 111. Thus as the piston 99 is urged downwardly no vacuum is produced in the upper portion of the chamber 97. Alternatively, the O-ring 107 may be eliminated and the upper portion of the chamber 97 sealed as shown and described in connection with FIGURE 5.

The chamber 97 is in continuous communication with the cylinder port 43 which in turn is connected to the chamber 31 of the spring brake (FIGURE 1). The cylinder port 43 also communicates with the emergency tank port 49 through a lifter 113 and past a check valve 115 which incorporates a valve seat 117, a seal 119 and a spring 121. The valve 115 is resiliently urged in the closed position by means of the spring 121 to thereby interrupt communication between the cylinder port 43 and the emergency tank port 49.

The piston 99 includes an annular shaped cam surface 123 which coacts with a ball 125 lying adjacent the lifter 113. Thus upon depression of the piston 99 the cam surface 123 urges the check valve 115 to open position whereby the ports 43 and 49 are placed in communication.

The purpose of the overall valve 41 is not only for the operation of the spring brake but also to supply air pressure to the emergency tank at all times that the spring brake is receiving air. The purpose of the spring brake itself is to apply the brakes fully and thereby stop the vehicle whenever the air pressure of the brake system is below a predetermined minimum, for instance, twenty pounds per square inch. The valve permits a relatively quick operation of the brakes upon reaching this predetermined minimum rather than a gradual application over the range of reduced pressure.

Referring to FIGURE 1, it will be realized that if the pressure in the chamber 31 were slightly reduced, the spring 39 will expand slightly and the plungers 33 and 13 will move to the left thereby gradually applying the brakes unknown to the driver. This gradual application of the brakes rapidly burn out the brake lining such that the brakes will become totally useless.

In operation when the valve 41 is first placed into the pneumatic system, that is, prior to any application of air pressure, it lies in a position as shown in FIGURE 2 with the seal 85 resiliently urged against the seat 87. When air is applied to the inlet 47 the pressure thereof merely tends to increase the contact between the seal 85 and the seat 87. Under these conditions it will be noted that the cylinder port 43 is connected through the chamber 97, past the valve seat 105, through port 59, chamber 63 and the exhaust port 81 to the atmosphere. Consequently, the chamber 31 of the spring brake will be exhausted by the spring 39 (FIGURE 1) and a spring brake will be fully applied.

Upon the driver moving the lever 91 to the upright position, the valve assumes the position shown in FIGURE 3. Thus the seal 85 is removed from the seat 87 and the seal 77 is urged against the seat 79. Under these conditions air pressure is applied from the inlet port 47 through chamber 53, port 59 and chamber 97 to the cylinder port 43. Consequently, the spring 39 in the brake cylinder is compressed and the spring brake is released.

In addition it should be noted that if the air pressure in the chamber 97 is sufficient to overcome spring 121 it will open the check valve 115 and air will be applied to the emergency tank port 49.

Moreover, air is also applied to the chamber 65 through the port 57. The dimensions of the active surfaces of the piston 67 and the seal 77 together with the respective leverage of the cam arms 93 and 95, are such that when equal pressure is applied to both the piston 67 and the seal 77 the spring 68 is compressed and the piston 75 is urged downward against the action of the spring 83. Thus, air pressure from the inlet port 47 which is admitted into the chamber 65, is sufficient to maintain the pistons 67 and 75 as they are positioned as shown in FIGURE 3.

In the embodiment of the invention shown, the active surface of the piston 67 is the cross sectional area of the chamber 65. The active surface of the seal 77, on the other hand, is only the cross sectional area defined by the seat 79 since pressure is applied only on this limited portion of the seal 77. Clearly, the cross sectional areas of the chamber 65 and the seal 77 could be altered and the same result accomplished by varying the length of the cam arms 93 and 95 by a comparable amount. Moreover, as will be described hereinafter, the pressure applied to the chamber 65 need not be the same as applied to the seal 77. Consequently, even wider variations in the active surface of piston 67 and seal 77 may be employed.

In the event that there is a leak in the pneumatic system, such that air pressure within the chamber 65 is below the above mentioned predetermined minimum, the pressure will then be insufficient to retain the spring 68 in its compressed position. The spring 68 will expand, free the cam 93 of the lever 91 and thus will release the piston 75. Under these conditions the spring 83 will urge the lifter 61 and the piston 75 upward to the position shown in FIGURE 2. In this position it is again noted that the cylinder port 43 is placed in communication with the atmosphere through the chamber 97, port 59, chamber 63 and the exhaust port 81. It should be noted, however, that the emergency tank port 49 is isolated from the atmosphere by means of the check valve 115. Thus the brakes are applied and the vehicle comes to a stop.

Since such conditions may occur in relatively embarrassing locations, such as in the middle of an intersection or bridge, means are provided to release the spring brake whereby the driver may move the vehicle at least a short distance.

In order to release the brake, the driver presses a plunger 127 downward to the position as shown in FIGURE 4. This downward pressure on the plunger 127 acting on the piston 99 not only urges the seal 101 against the seat 105 but also opens check valve 115 by operation of the cam surface 123. Thus, the emergency tank port 49 is connected to the cylinder tank port 43 and air pressure from the emergency tank is applied to the spring brake cylinder chamber 31.

It should be realized that in the embodiment of FIGURES 2, 3 and 4, brakes are released by pressure applied via emergency tank port 49 only so long as the plunger 127 is held depressed since upon the release of the plunger, the spring 103 will urge it upward thereby separating the seal 101 from the seat 105 and permitting the check valve 115 to close. Cylinder port 43 is thus connected to the atmosphere through the exhaust port 81. Under such conditions of operation the driver is not able to shift gears and consequently, may only drive a short distance such as to the side of the road where he may park until the cause of the original leak is determined and corrected.

Moreover, upon subsequent development of air pressure in the main air supply tank 25 and shifting of the lever 91 to the position shown in FIGURE 3, the piston 99 is urged upward regardless of the spring 103.

Figure 5:
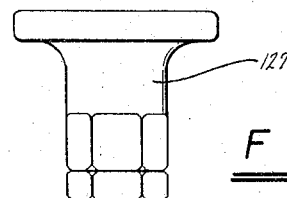
FIGURE 5 is a partial view similar to FIGURES 2 to 4 showing an alternate embodiment of the invention.
Figure 5:
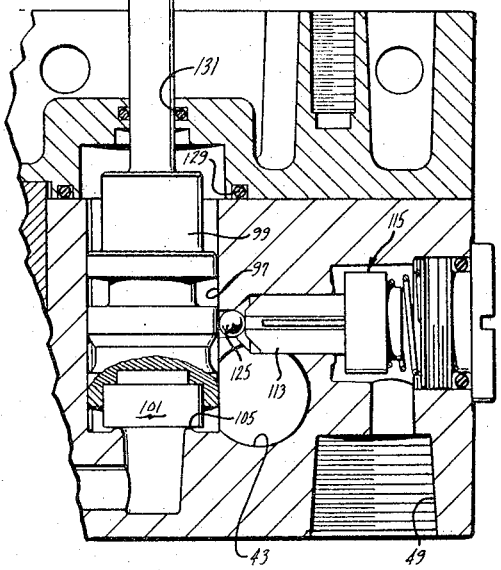

Referring to FIGURE 5, an alternative embodiment of the invention is shown. It should be noted in FIGURE 5 that the piston 99 (as well as the other portions of the valve which are not shown) is identical to that as shown in FIGURES 2, 3 and 4, but the spring 103 and the O-ring 107 have been eliminated. Rather than the O-ring 107 the upper portion of the chamber 97 is sealed from the atmosphere by means of O-rings 129 and 131. Operation of the embodiment shown in FIGURE 5 is similar to that as shown in FIGURES 2, 3 and 4, with the exception that once the plunger 127 is depressed it remains depressed. Without the O-ring 107, air pressure from the emergency tank port 49 leaks past the piston 99 to the upper portion of the chamber 97 and urges the seal 101 against the seat 105. Thus, the operator may remove his hand from the plunger 127 and continue to drive the vehicle. In order to reapply the spring brakes, the plunger 127 is lifted by the operator whereby the cylinder port 43 is placed in communication with the atmosphere in the usual manner set forth in the description of FIGURES 2, 3 and 4.

However, as in the embodiment of FIGURES 2 to 4, upon subsequent development of air pressure in the main tank 25 and shifting of the lever 91, the piston 99 is automatically urged upward and air is again supplied to the emergency tank.

Figure 6:
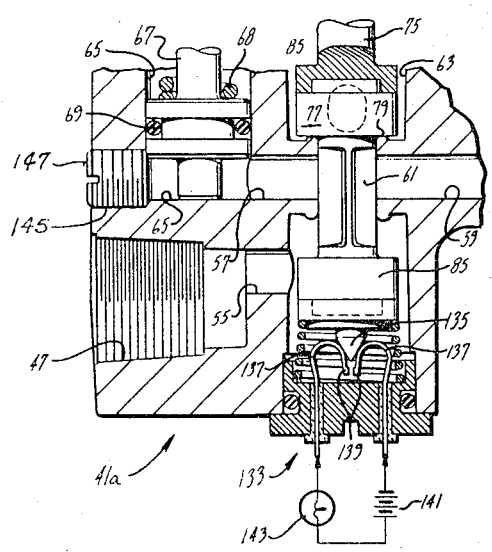
FIGURE 6 is a partial view similar to FIGURES 2 to 4 showing a switch for use in the invention for indicating the application of the spring brake.

FIGURE 6 shows another embodiment with respect to the invention and shows the plug 89 replaced by a switch assembly 133. A wedge shaped piston 135 is secured to the lower end of the seal 85 for selective communication with resilient terminals 137. The piston 135 is formed of a nonconductive material whereby when the seal 85 is in its downward position as shown in FIGURES 3 and 6, contacts 139 on the terminals 137 are spread apart. Alternatively, when the seal 85 is in its upper position as shown in FIGURES 2 and 4, that is when the spring brake is applied, the contacts 139 are urged together by the resiliency of the terminals 137.

An indicating circuit such as a battery 141 and an indicator light 143 may be connected to the terminals 137 whereby upon closing contacts 139 the light 143 is turned on. A light, such as the light 143, may be the normal stop lights of a vehicle or may be a light located on the dashboard of the vehicle to indicate to the driver that the spring brake is being applied.

In addition to the use of the valve in an automatic operation of the spring brake, it should be realized that voluntary operation of the spring brake may be accomplished with the same valve by merely shifting the lever 91 from the position at which it rests during driving the vehicle and as shown in FIGURE 3, to the position as shown in FIGURE 2.

Thus, the driver, when parking a truck or other vehicle need merely move the lever 91 into the position shown in FIGURE 2 in order to utilize the spring brake as a parking brake.

It should be recognized that the automatic operation of the spring brake is quick acting and is dependent upon a certain minimum pressure as determined by the resilient force of the spring 68. Thus, referring to FIGURE 3, once the pressure within the chamber 65 is insufficient to compress the spring 68, the slight release of the spring 68 permits free movement of the cam arm 93 beyond the upper end of the piston 67.

The material of the valve seal 77 is preferably sufficiently resilient to allow limited movement of the piston 75 without breaking the seal between the seat 79 and the valve seal 77. This limited movement of piston 75 corresponds to movement of piston 67 sufficient to release the cam arm 93. With the cam arm 93 so released, the spring 83 is free to quickly urge the seal 85, the lifter 61, the seal 77 and the piston 75 to the position as shown in FIGURE 2. Thus, the valve quickly switches from the position shown in FIGURE 3 to the position shown in FIGURE 2 and the spring brake is thereby applied.

In accordance with the embodiments of the invention described, the pistons 67 and 75 are shown interconnected by means of the cam arms 93 and 95, it will be apparent that several other equivalent structures may be incorporated. Thus the pistons 67 and 75 may be coaxial and the lever 91 may be replaced by an intermediate slide for moving either one of the pistons away from the other. Moreover, it should be recognized that while the pressure at the chambers 65 has been described as the same as the pressure in the ports 57 and 59, the port 57 may be sealed closed and pressure from an additional and external source applied to the chamber 65 as a reference. Thus, the additional source of pressure may be applied to the opening 145 by removing the plug 147 and inserting therein an auxiliary or reference pressure line.

I claim:
1. A valve for use in spring brake systems and the like comprising a body, first and second chambers in said body, first and second pistons disposed in said first and second chambers respectively, the active pressure area of said first piston being greater than the active pressure area of said second piston to provide a differential pressure area, said body defining an inlet port adapted to be connected to a source of air pressure, said first chamber being in selective communication with said inlet port, resilient means coupled to said first piston urging the first piston against pressure at said inlet port, movable means relating said first and second pistons for opposed movement in their respective chambers, said differential pressure area being sufficient such that at a preselected minimum pressure the force of said resilient means is overcome and said first and second pistons are urged, via said movable means, in accordance with the pressure on said first piston, means responsive to movement of said first piston in overcoming the force of said resilient means by said pressure, serving to interrupt communication between said second chamber and said inlet port, means permitting the free movement of the second piston when said resilient means is released responsive to reduction of pressure at said inlet means below the predetermined minimum, said resilient means urging the first piston against the lowered pressure and serving to free said second piston for independent movement to an exhaust position, a cylinder port, and means for venting said cylinder port to the atmosphere in response to said movement of said second piston to said exhaust position.

2. A valve as defined in claim 1 wherein said means responsive to movement of said first piston for interrupting communication between said second chamber and said inlet port comprises a valve having a valve seat and a resilient valve seal carried by said second piston, said resilient valve seal being sufficiently resilient to permit limited movement of the seal, and said second piston, with respect to said seat prior to breaking sealed contact between the seat and the seal.

3. A valve for use with spring brakes and the like comprising a body, said body defining said inlet port and a first chamber in communication with said inlet port, a second chamber, first valve means for selectively and normally placing said first chamber in communication with said second chamber, an exhaust port, second valve means operable in response to said first valve means for placing said second chamber in communication with the exhaust port when communication between said first and second chambers is interrupted by said first valve means, a cylinder port adapted to form a fluid connection to the spring brake, said cylinder port being in communication with said second chamber, means in said first chamber operable in response to abnormal reduction in pressure therein for closing said first valve means to interrupt communication between said first chamber and the second chamber and serving to open said second valve means to dispose said second chamber and said cylinder port in communication with the exhaust port, an auxiliary tank port for connection to an auxiliary tank, check valve means for placing said cylinder port and said auxiliary tank port in communication with each other upon application of sufficient air pressure at the cylinder port to overcome the action of the check valve, and means for manually opening said check valve means to place said auxiliary tank in fluid communication with said cylinder port to operate the spring brake.

References Cited by the Examiner
UNITED STATES PATENTS

| | | | |
|---|---|---|---|
| 1,644,171 | 10/1927 | Caldwell | 137—554 |
| 2,864,580 | 12/1958 | Lemoine | 251—368 |
| 3,002,520 | 10/1961 | Morse | 137—102 |
| 3,027,907 | 4/1962 | Lee | 137—107 |
| 3,059,975 | 10/1962 | Morse | 303—29 |

WILLIAM F. O'DEA, *Primary Examiner.*

MARTIN P. SCHWADRON, *Examiner.*

D. R. MATTHEWS, *Assistant Examiner.*